Feb. 20, 1951     M. C. FLETCHER     2,542,129
STRUCTURAL MEMBER
Filed July 12, 1947
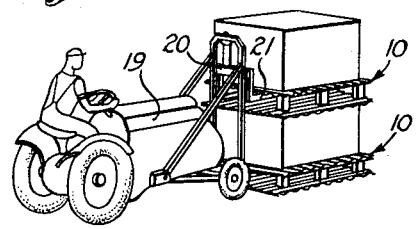
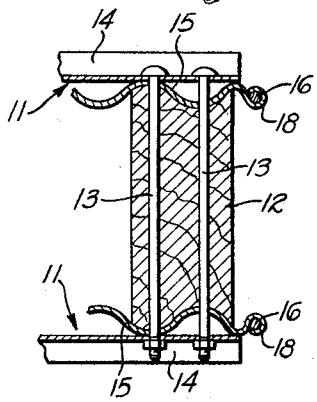
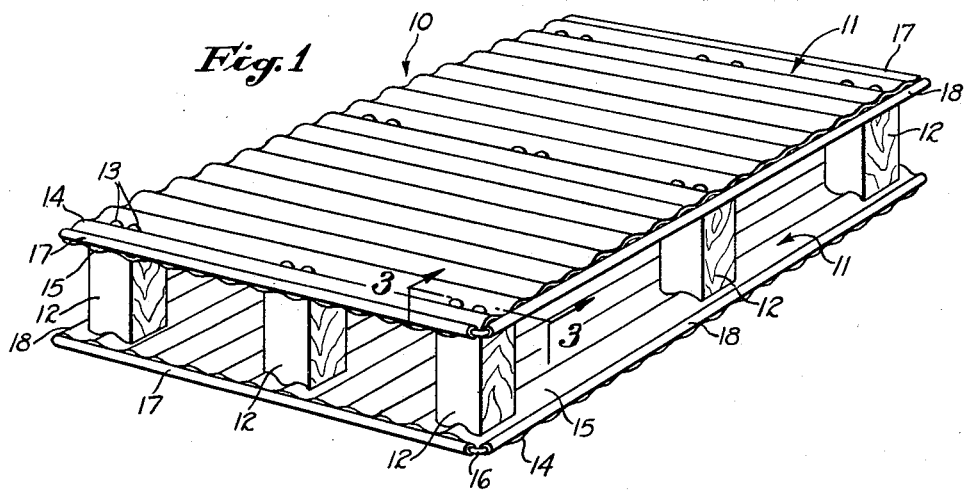
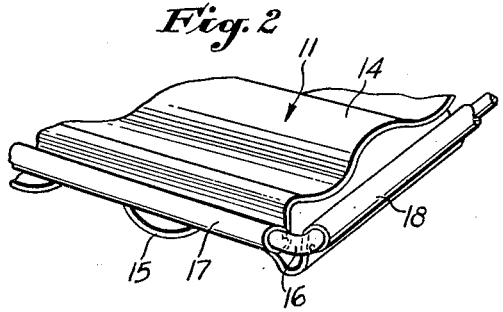
INVENTOR:
MAURICE C. FLETCHER
BY HIS ATTORNEYS
HARRIS, KIECH, FOSTER & HARRIS
By Clarence F. Kiech Patented Feb. 20, 1951

2,542,129

UNITED STATES PATENT OFFICE 2,542,129

STRUCTURAL MEMBER

Maurice C. Fletcher, Altadena, Calif.

Application July 12, 1947, Serial No. 760,548

4 Claims. (Cl. 248—120)

My invention relates in general to structural members and a primary object thereof is to provide a structural member of simple construction which is capable of supporting large loads but which is of relatively light weight.

An important object of the invention is to provide a structural member which includes a laminated panel formed of two or more corrugated sheets, the corrugations of adjacent sheets being substantially perpendicular to each other.

Another object is to provide a laminated panel of the foregoing character wherein the edges of the sheets are reinforced by rolling portions thereof around a peripheral rod.

Another important object of the invention is to provide a structural member which includes a pair of such laminated panels in spaced, parallel relationship.

The foregoing objects of my invention, together with various other objects and various advantages thereof which will become evident hereinafter, may be attained through the employment of the exemplary embodiment illustrated in the accompanying drawing and described in detail hereinafter. Referring to the drawing, which is intended as illustrative only:

Fig. 1 is a perspective view of a structural member which embodies the fundamental principles of the invention;

Fig. 2 is an enlarged, fragmentary perspective view showing an edge reinforcement for the sheets of a laminated panel forming part of the structural member;

Fig. 3 is an enlarged, fragmentary sectional view which is taken along the broken line 3—3 of Fig. 1; and Fig. 4 is a perspective view on a reduced scale showing the structural member in use as a freight handling pallet.

Referring particularly to Figs. 1 to 3 of the drawing, I show a structural member 10 which includes a pair of laminated panels 11 and which includes a plurality of spacing members or spacers 12 for maintaining the panels in spaced, parallel relationship, the spacing members being spaced apart for a reason which will be pointed out hereinafter. As best shown in Fig. 3 of the drawing, the panels 11 and spacers 12 may be interconnected by bolts 13 extending through the spacers and panels.

Each panel 11 includes two (or more) corrugated sheets 14 and 15 which are preferably, although not necessarily, formed of metal. I have found that aluminum, for example, is very satisfactory for the corrugated sheets 14 and 15 and provides a structural member 10 which is light in weight.

The corrugated sheets 14 and 15 of each of the panels 11 are arranged with adjacent sides thereof in contact and may be spot welded or otherwise secured together. The corrugations of the sheets 14 of each panel 11 are perpendicular to the corrugations of the sheets 15 thereof so that the panels have substantially uniform characteristics in all directions. The use of panels 11 having sheets 14 and 15 whose corrugations are perpendicular also provides panels which are very strong for their size and weight, which is an important feature of the invention.

The edges of each of the panels 11 are reinforced by a peripheral rod 16 which is preferably continuous and which includes portions that extend along the edges of the sheets 14 and 15 forming the panel. As best shown in Fig. 2, a portion 17 of each edge of the sheet 14 which is parallel to the corrugations thereof is rolled around the corresponding portion of the rod 16. Similarly, a portion 18 of each edge of the sheet 15 which is parallel to the corrugations thereof is rolled around a corresponding portion of the rod 16. Rolling the edge portions 17 and 18 of the corrugated sheets 14 and 15, respectively, of each panel 11 around the rod 16 provides a positive reinforcement for the edges of the panels and represents an important feature of the invention.

In Fig. 4 of the drawing I show my structural member 10 in use as a freight handling pallet, although various other uses therefor will be apparent to those skilled in the art. The construction of the structural member 10 is such that it may be lifted by a conventional truck 19 which is provided with the usual hydraulic hoist 20, the fingers 21 of the hoist being insertable between the panels 11 of the structural member and between the spacers 12 separating the panels. It will be noted that the spacers 12 are so arranged that the structural member 10, when used as a freight handling pallet, may be lifted with the industrial truck 19 from any one of its sides. The structural member 10 is reversible so that it may be used as a freight handling pallet with either of the laminated panels 11 uppermost.

By arranging the corrugated sheets 14 and 15 of each panel 11 perpendicularly of each other, by reinforcing the edges of the panels with the rod 16, and by rigidly interconnecting the panels, all as heretofore described, I provide a sturdy structural member 10 which will withstand a great deal of abuse, but which is of light weight. Moreover, the structural member is of simple construction and may be manufactured and assembled readily.

Although I have disclosed a specific embodiment of my invention herein for illustrative purposes, it will be understood that I do not desire to be limited thereto since various changes, modifications and substitutions may be incorporated in this embodiment without necessarily departing from the spirit of the invention. Moreover, the embodiment disclosed herein is susceptible to various applications other than the one specifically mentioned. Consequently, I do not desire to be limited to the specific disclosures contained herein except insofar as may be required by the appended claims.

I claim as my invention:

1. A laminated structural member comprising: a pair of parallel sheets having adjacent sides in contact and each having an edge portion, said edge portions including an angle greater than zero therebetween; and a pair of rigidly connected rods extending along said edge portions, respectively, said edge portions being rolled around the respective rods.

2. A laminated structural member comprising: a pair of parallel corrugated sheets having adjacent sides in contact and each having an edge portion which is substantially parallel to the corrugations thereof, said edge portions of the respective sheets including an angle greater than zero therebetween; and a pair of rods extending along said edge portions, respectively, said edge portions being rolled around the respective rods.

3. In a laminated structural member, the combination of: a pair of corrugated sheets each having a pair of spaced edge portions which are substantially parallel to the corrugations thereof, said sheets being arranged in parallel relationship with adjacent sides thereof in contact and with the respective corrugations thereof extending substantially perpendicularly; and a continuous peripheral rod having portions which extend along said edge portions of said sheets, respectively, said edge portions of said sheets being rolled around the respective portions of said rod.

4. In a structural member, the combination of: a pair of spaced, parallel panels of laminated construction and each including a pair of parallel corrugated sheets, the corrugations of one of said sheets of each of said panels forming an angle greater than zero with the corrugations of the other of said sheets thereof; a plurality of spacers between said panels, each of said spacers having a pair of spaced, corrugated surfaces respectively engaging and complementary to the inner corrugated sheets of said panels; and means for interconnecting said spacers and said panels.

MAURICE C. FLETCHER.

REFERENCES CITED

The following references are of record in the file of this patent:

UNITED STATES PATENTS

| Number | Name | Date |
|---|---|---|
| 156,470 | Warner | Nov. 3, 1874 |
| 624,828 | Lantzke | May 9, 1899 |
| 893,703 | Butler | July 21, 1908 |
| 1,612,382 | Lehman | Dec. 28, 1926 |
| 2,306,752 | Riemenschneider et al. | Dec. 29, 1842 |
| 2,369,944 | Cahners | Feb. 20, 1945 |
| 2,388,730 | Fallert | Nov. 13, 1945 |
| 2,455,197 | Sullivan | Nov. 30, 1948 |